United States Patent [19]
Jungerman et al.

[11] Patent Number: 5,841,917
[45] Date of Patent: Nov. 24, 1998

[54] OPTICAL CROSS-CONNECT SWITCH USING A PIN GRID ACTUATOR

[75] Inventors: Roger Lee Jungerman, Petaluma; David M. Braun, Santa Rosa, both of Calif.

[73] Assignee: Hewlett-Packard Company, Palo Alto, Calif.

[21] Appl. No.: 792,593

[22] Filed: Jan. 31, 1997

[51] Int. Cl.⁶ ............................................ G02B 6/26
[52] U.S. Cl. ............................ 385/17; 385/15; 385/16; 385/18; 385/20; 385/24
[58] Field of Search .................. 385/15, 16, 17, 385/18, 20, 22, 24, 25, 27, 31

[56] References Cited

U.S. PATENT DOCUMENTS

| | | | |
|---|---|---|---|
| 4,249,794 | 2/1981 | Haley | 385/18 X |
| 4,303,303 | 12/1981 | Aoyama | 385/18 X |
| 4,322,126 | 3/1982 | Minowa et al. | 385/18 X |
| 4,580,873 | 4/1986 | Levinson | 385/17 X |
| 4,580,973 | 4/1986 | Levinson | 385/17 X |
| 4,653,850 | 3/1987 | Boirat et al. | 385/17 X |
| 4,830,452 | 5/1989 | Oxley | 385/17 X |
| 5,018,131 | 5/1991 | Shah et al. | 385/18 X |
| 5,042,889 | 8/1991 | Benzoni | 385/16 |
| 5,048,912 | 9/1991 | Kunikane et al. | 385/23 |
| 5,133,030 | 7/1992 | Lee | 385/19 |
| 5,386,485 | 1/1995 | Saito et al. | 385/17 |
| 5,436,986 | 7/1995 | Tsai | 385/16 |
| 5,440,655 | 8/1995 | Kaplow et al. | 385/25 |
| 5,581,644 | 12/1996 | Saito et al. | 385/17 |
| 5,642,446 | 6/1997 | Tsai | 385/16 |

*Primary Examiner*—Brian Healy
*Attorney, Agent, or Firm*—John L. Imperato

[57] ABSTRACT

An optical cross-connect switch incorporates a pin grid actuator to selectively position optical elements relative to optical beams in the switch. A high density array of aligned, optically reflective elements is attached to the ends of independently selectable and moveable pins in the pin grid actuator. The pin grid actuator is the type extensively used in dot matrix printers. Linear motion of the pins causes the reflective element attached to the pin to intercept optical beams provided by input fibers coupled to the switch. Intercepted optical beams are redirected to designated output fibers, also coupled to the switch. A staggered arrangement of the input and output fibers equalizes all of the signal pathlengths through the switch, regardless of which pin in the pin grid actuator is selected. According to an alternate preferred embodiment of the present invention, multiple optical cross-connect switches are cascaded using a staggered arrangement of interconnecting fibers.

15 Claims, 4 Drawing Sheets

OPTICAL CROSS-CONNECT SWITCH USING A PIN GRID ACTUATOR

FIELD OF THE INVENTION

The present invention relates to optical switches, and more particularly, to an optical cross-connect switch that uses a pin grid actuator to selectively position optical elements in optical signal paths within the switch.

BACKGROUND OF THE INVENTION

Optical switches route optical signals in complex fiber networks within telecommunication systems. Optical switches, such as those described by Kunikane et al. in U.S. Pat. No. 5,048,912 and Benzoni in U.S. Pat. No. 5,042,889, use drive mechanisms that move fiber collimators, mirrors or other optical switching elements to route optical signals. Because the drive mechanisms are large, they limit the density of switching elements in these switches. Levinson in U.S. Pat. No. 4,580,873 forms a high density array of optical switching elements on a semiconductor substrate. Selected switching elements within the array are electrostatically actuated to rotate between a horizontal and vertical positions. In the vertical position, the switching elements intercept and redirect optical signals within the switch. However, the optical pathlength through the switch varies, depending on which switching elements in the array are actuated. The pathlength variations preclude optimizing optical magnification and increases insertion loss of the switch. Maintaining low insertion loss is especially important in telecommunication systems, as the system's performance generally degrades as the insertion loss of the switch increases. While the beam diameter of the optical signal may be increased to reduce insertion loss, larger beams impose correspondingly tighter tolerances on angular alignment of the reflecting elements, reducing the manufacturing yield of the switch.

SUMMARY OF THE INVENTION

According to the preferred embodiment of the present invention, an optical cross-connect switch incorporates a pin grid actuator to selectively position optical elements that intercept and redirect optical beams in the switch. The pin grid actuator is the type extensively used in dot matrix printers, enabling the optical switch to have low cost, small pin pitch, high switching speed and a high number of input and output fibers. A high density array of aligned, optically reflective elements is attached to the ends of independently selectable pins in the pin grid actuator. Linear motion of each pin causes the reflective element attached to the pin to intercept optical beams provided by input fibers coupled to the switch. Intercepted optical beams are redirected to designated output fibers, also coupled to the switch. A staggered arrangement of the input and output fibers equalizes all signal pathlengths through the switch, regardless of which pin in the pin grid actuator is selected. Due to the small pin-pitch and equalized pathlength, optical magnification is optimized to reduce insertion loss and relax the alignment tolerances of the reflective elements to provide high manufacturing yield for the switch. According to an alternate preferred embodiment of the present invention, multiple optical cross-connect switches are cascaded using interconnecting fibers to increase the number of input and output fibers.

DETAILED DESCRIPTION OF THE PREFERRED EMBODIMENT

Figure 1A:
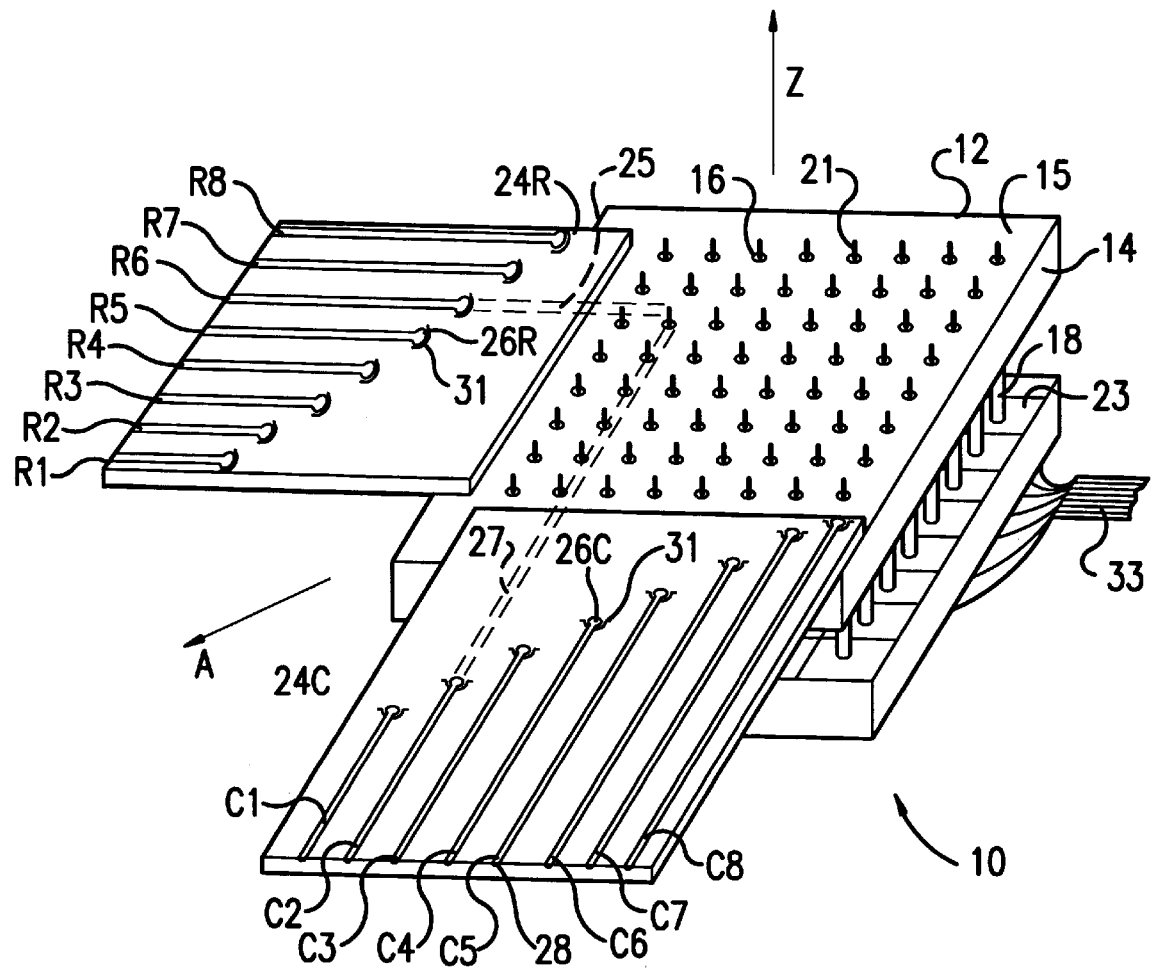
FIGS. 1A–1C show perspective views of an optical cross-connect switch constructed according to a preferred embodiment of the present invention.

FIG. 1A shows a perspective view of an optical cross connect switch 10 constructed according to a preferred embodiment of the present invention. A pin grid actuator 12 includes a housing 14 that has a planar top surface 15, an array of holes 16 formed through the housing 14 perpendicular to the planar top surface 15, an array of pins 18 corresponding to the array of holes 16, and an array of actuators 23. The pins 18 extend through the holes 16 in the housing 14. The first end 19 of each pin 18 is proximate to the top surface 15, and the second end 17 of each pin 18 protrudes through a bottom side of the housing 14 and couples to the actuators 23 below the housing 14. The pin grid actuator 12 is the type used in commercially available dot matrix computer printers, such as the Epson model ELX300 available from Epson Corporation. Each actuator 23 is independently addressable via a control line 33 coupled to the actuator 23. The actuators 23 provide linear motion to selected pins 18 in response to electrical signals applied to the control lines 33. The pins 18 move in a direction parallel to a Z-axis and orthogonal to the planar top surface 15.

Figure 1B:
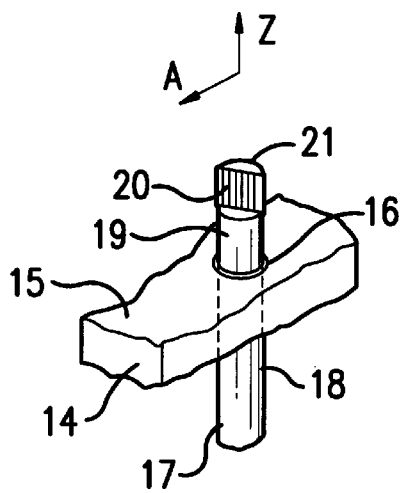
Figure 1C:
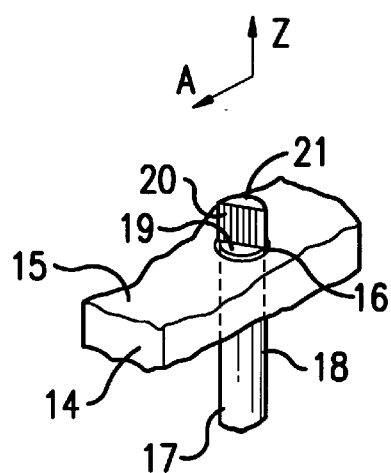

FIGS. 1B and 1C show detailed views of an optical element 21 attached to a pin 18 in the optical cross-connect switch 10 of FIG. 1A. An array of optical elements 21 is attached to the array of pins 18. Each optical element 21 attaches to the first end of a separate pin 18 in the array, and each optical element 21 has a flat reflective surface 20 that is perpendicular to an alignment axis A. The alignment axis A for all of the reflective surfaces 20 are parallel and parallel to the planar top surface 15. Each pin 18 moves through its corresponding hole 16 in the housing 14, thus moving the optical element 21 attached to the pin 18.

In the actuated state, shown in FIG. 1B, the actuator arm moves the pin 18 in the +Z direction to an extended position, causing the reflective surface 20 to intercept the incident optical beam 25. The intercepted incident beam 25, shown in FIG. 1A, is redirected by the reflective surface 20, producing a reflected optical beam 27 which is directed orthogonal to the incident optical beam 25. FIG. 1C shows the pin 18 in the non-actuated state. In this state, the pin 18 is retracted into the hole 16, and the reflective surface 20 does not intercept the incident optical beam 25. In this example each optical element has a reflective surface 20. Other types of optical elements 21 including prisms, collimators or diffraction gratings may be attached to the ends of the pins 18 to redirect optical beams within the switch 10.

Row fibers R1–R8 provide the incident optical beams 25 to the switch 10 and are adhered to a row substrate 24R of the switch. The row fibers R1–R8 lie within a plane that is parallel to the planar top surface 15. A lens 26R, such as a gradient index (GRIN) lens or a ball lens, caps each row fiber to collimate incident beams 25. The row substrate 24R is formed from silicon, and a series of parallel grooves 28 etched in the top surface of the substrate 24R receive the row fibers R1–R8. A series of slots 31 etched in the substrate receive the lenses 26C. Similarly, column fibers C1–C8 are adhered to a column substrate 24C and the column fibers also lie within a plane that is parallel to the planar top surface 15. A lens 26C also caps each column fiber C1–C8 to focus the reflected beams 27 onto the column fibers. A series of parallel grooves 28 etched in the column substrate 24C receives the column fibers C1–C8, and slots 31 etched in the column substrate receive the lenses 26C. A separate row substrate 24R and column substrate 24C may be used, or the substrates may be combined to form a single continuous substrate, accommodating both the row fibers R1–R8 and the column fibers C1–C8. As an alternate to the silicon substrate, ceramic or other substrate material may be etched, laser cut, or saw scribed to provide the grooves 28 and slots 31 for receiving the fibers and lenses 26R, 26C. The row and column fibers may also be secured to the substrate using adhesives or other known means. The substrates 24R, 24C are secured to the housing 14.

The incident beams 25, exit the row fibers R1–R8 and enter the column fibers C1–C8 parallel to the planar top surface 15 of the housing 14. When a reflective surface 20, intercepts an incident beam 25 emanating from a row fiber R1–R8, for example row fiber R6, a reflected beam 27 is formed. The reflected beam 27 is orthogonal to the incident optical beam 25 and is directed to enter a corresponding column fiber, for example C2. In the optical cross-connect switch 10, an incident beam 25 may emanate from each of the row fibers R1–R8 and may be redirected to any of the column fibers C1–C8 by actuating the appropriate pin 18 in the array to position the reflective surface 20 in the paths of the incident beams 25. In this example, the pin 18 in row 6 and column 2 is actuated and the pin extends through the planar top surface, causing reflective surface 20 to intercept incident beam 25 from row fiber R6. The reflected beam 27 is received by column fiber C2.

Figure 2:
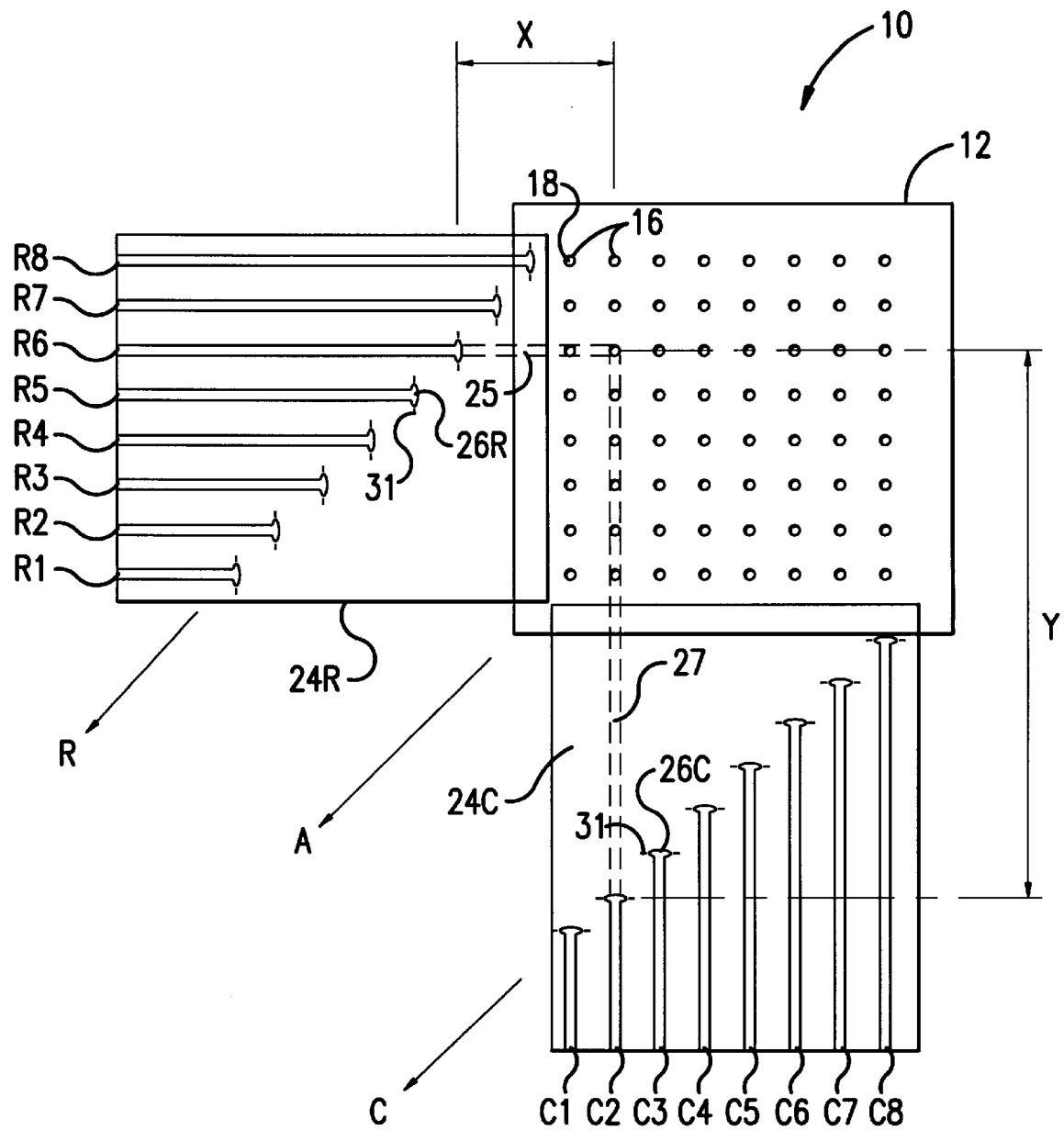
FIG. 2 shows a top view of the switch of FIG. 1A.

FIG. 2 shows a top view of the optical cross-connect switch 10. The pins 18 and the attached optical elements 21 are arranged in a square matrix wherein the number of rows and columns of the holes 16, pins 18 and optical elements 21 are equal. In this example, there are eight rows and eight columns, forming an 8 by 8 cross-connect switch 10. The pin-pitch, or spacing between adjacent pins 18 in a row or column, is 1.1 mm.

The pathlength through the switch 10 equals the sum of the distances over which the incident beams 25 and the reflective beams 27 propagate. The incident beam 25 propagates the distance x between a lens 26R of a row fiber (for example R6) and a selected reflective surface 20 in the row corresponding to the row fiber R6. The reflected beam 27 propagates the distance y between the reflective surface 20 and the lens 26C of the column fiber (for example C2) corresponding to the column of the selected reflective surfaces. One such pathlength, equal to the sum of the distances x and y is shown.

Pathlengths in the optical switch 10 are equalized by staggering the lenses 26R, 26C of the row fibers R1–R8 and column fibers C1–C8 along axis R and axis C, respectively. The axes R and C are parallel to the alignment axis A, which is centered along the diagonal of the square matrix, and offset equal distances on either side of the alignment axis A. The reflective surfaces 20 which are orthogonal to axis A, are at a 45 degree angle to the incident beam 25 and at a 45 degree angle to the reflected beam 27. Thus, the pathlength is independent of which optical elements 21 in the array are selected to intercept and direct incident beams 25.

The lenses 26R, 26C are shaped to provide a six times (6×) optical magnification over the switch's pathlength. The 6× optical magnification through the switch 10 is optimized to reduce insertion loss and relax angular alignment tolerance requirements, relative to alignment axis A, of the reflective surfaces 20. Low insertion loss is especially important when the switch 10 is used in telecommunication systems. Relaxing the alignment tolerance also increases manufacturing yield for the switch 10.

Insertion loss of the switch 10 depends not only on the angular alignment, but also on the physical spacing, or pitch, of the reflective surfaces 20 in the array of optical elements 21. Variations in angular alignment are measured relative to the alignment axis A and effect the angle of reflected beams 27 in the switch 10. Variations in pitch cause corresponding offsets in the reflected beam 27's position relative to the column lenses 26C. With accurate angular alignment and pitch of the optical elements 21, insertion loss in the range of 0.3 to 0.5 dB is achieved. Using GRIN lenses 26R, 26C and a 6× optical magnification, as in this example, an angular alignment variation of 0.1 degree degrades insertion loss by approximately 0.2 dB. Similarly, a pitch variation of 10 microns also degrades insertion loss by approximately 0.2 dB. Thus, tight tolerance on both angular alignment and pitch are necessary to achieve low insertion loss.

Figure 3A:
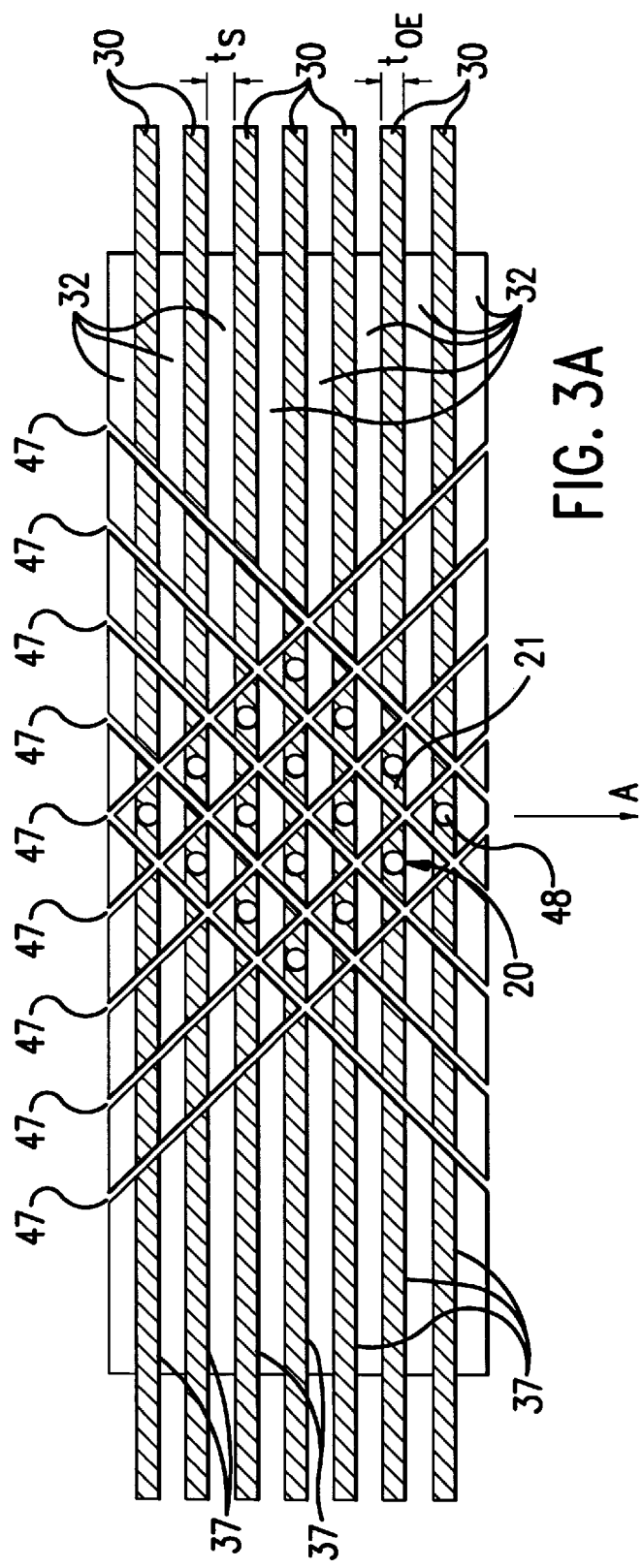
FIGS. 3A and 3B show an array of optical elements for use in the optical cross-connect switch of FIG. 1A.
Figure 3B:
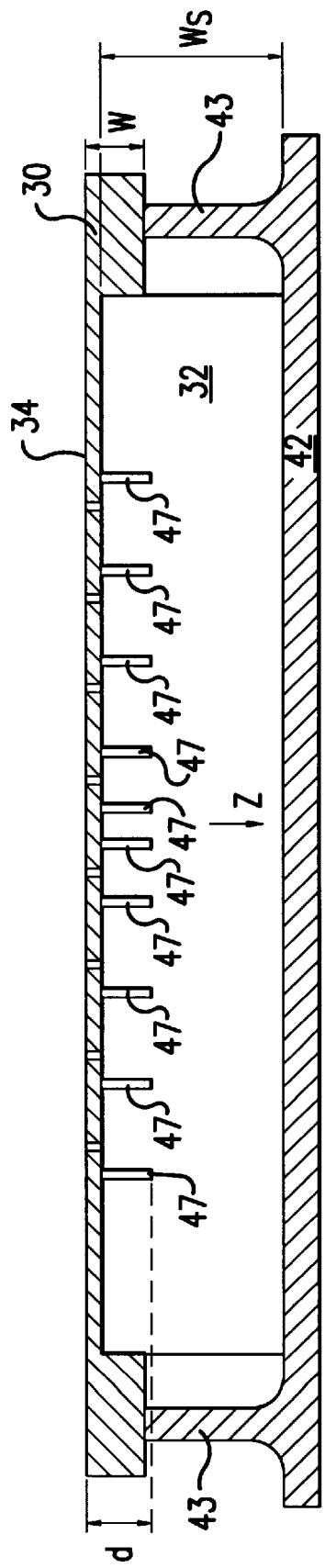

Accurate pitch and angular alignment are achieved by fabricating the entire array of optical elements 21 and then simultaneously attaching the array to the ends of the corresponding pins 18 in the pin grid actuator 12. FIGS. 3A and 3B show a 4 by 4 array of optical elements 21, fabricated for use in an optical cross-connect switch. An 8 by 8 array would be fabricated for use with the optical cross-connect switch 10 shown in FIG. 1A. The array of optical elements 21 is formed from a glass slide or other type of rigid substrate having a predetermined thickness $t_{OE}$. In this example, $t_{OE}$=300 micrometers. One side of the glass slide is coated with layers of optically reflective materials such as a titanium (Ti) layer, followed by a gold (Au) layer, to form an optically reflective face 37. The optically reflective face provides the reflective surfaces 20 of the optical elements 21. The slide is sawn into narrow strips 30 which have a width W. In this example W equals 1 millimeter. The width of the narrow strips 30 determines the height of the optical elements 20. A second glass slide, has a precisely defined thickness $t_S$, in this example 478 micrometers, and each side has a ground glass finish. This second glass slide is also sawn to form spacers 32 which having a width Ws that is wider than the narrow strips 30. In this example the spacers 32 are 3 mm wide. As shown in FIG. 3A, the narrow strips 30 and the spacers 32 are alternately stacked.

The stack of alternating spacers 32 and narrow strips 30 is clamped together in the jaws of a vise. The vise has risers 43 (shown in FIG. 3B) that position each narrow strip 30 so that a first edge 34 protrudes 0.25 mm above the spacers 32. FIG. 3B shows a side view of the stack of spacers 32 and narrow strips 30. The glass slide used to form the narrow strips 30 is longer than the second glass slide used to form the spacers 32, so that only the narrow strips 30 are supported by the risers 43, while the spacers 32 rest on the base 42 of the vise.

The narrow strips 30 are sawn into separate pieces which form the individual optical elements 21. The resulting saw kerfs 47 are shown in FIGS. 3A and 3B. In this example, the saw kerfs 47 are spaced 1.1 mm apart and form a grid pattern. Each saw kerf is at a 45 degree angle to the alignment axis A. Although other saw kerf patterns may be used to cut separate optical elements 21 from the narrow strips 30, this grid pattern provides the widest reflective surface 20 for the pitch and alignment of optical elements 21 in the switch 10. The depth d of the saw kerfs 47 is adjusted to be greater than width W so the narrow strips 30 are cut through and the spacers 32 are only partially scribed. The narrow strips 30 and the spacers 32 remain held in position by the vise while the optical elements 21 formed by cutting the narrow strips 30 are each attached to a corresponding pin 18 in the pin grid actuator 12 (not shown in FIGS. 3A and 3B).

An adhesive, such as epoxy, is deposited on the ends of the pins 18 in the pin grid actuator 12. The pin grid actuator is inverted and positioned with the adhesive in contact with the array of optical elements 21 so that each pin 18 contacts a corresponding pin location point 48 on each optical element 21 in the array. Attachment of the pins 18 while the optical elements 21 are held in position by the vise assures that the pitch and angular alignment of the optical elements 21 is independent of any slight variations in the pin-pitch of the pins 18 in the pin grid actuator 12. The angular alignment and pitch of the optical elements 21 is therefore determined by the position of the optical elements 21 in the vise.

The pitch of the optical elements 21 is dependent upon the thickness $t_S$ of the spacers 32, and the thickness $t_{OE}$ of the narrow strips 30. The thickness $t_{OE}$ of the narrow strips 30 and the thickness $t_S$ of the spacers 32 are chosen so that the optical elements 21 attach to corresponding pins 18, and align with the row fibers R1–R8 and the column fibers C1–C8.

Once the epoxy is cured, attaching the optical elements 21 and the pins 18, the stack of alternating narrow strips 30 and spacers 32 is released from the vise. The ground surfaces of the spacers 32 enable the spacers to be easily separated from the optical elements 21. The optical elements 21 are then separate from each other and move independently as each pin 18 in the pin grid actuator 12 is moved. Although a square array of optical elements 21 and pins 18 is shown, rectangular arrangements or other arrangements of optical elements may also be used to provide equal optical pathlengths through the cross-connect switch 10. Other types of optical elements 21 may also be attached to the pins 18. For example, an array of wavelength selective filters or prisms attached to the pins 18 in place of the reflective surfaces 20 enables incident beams of selected wavelengths to be redirected through the optical cross-connect switch 10.

Figure 4:
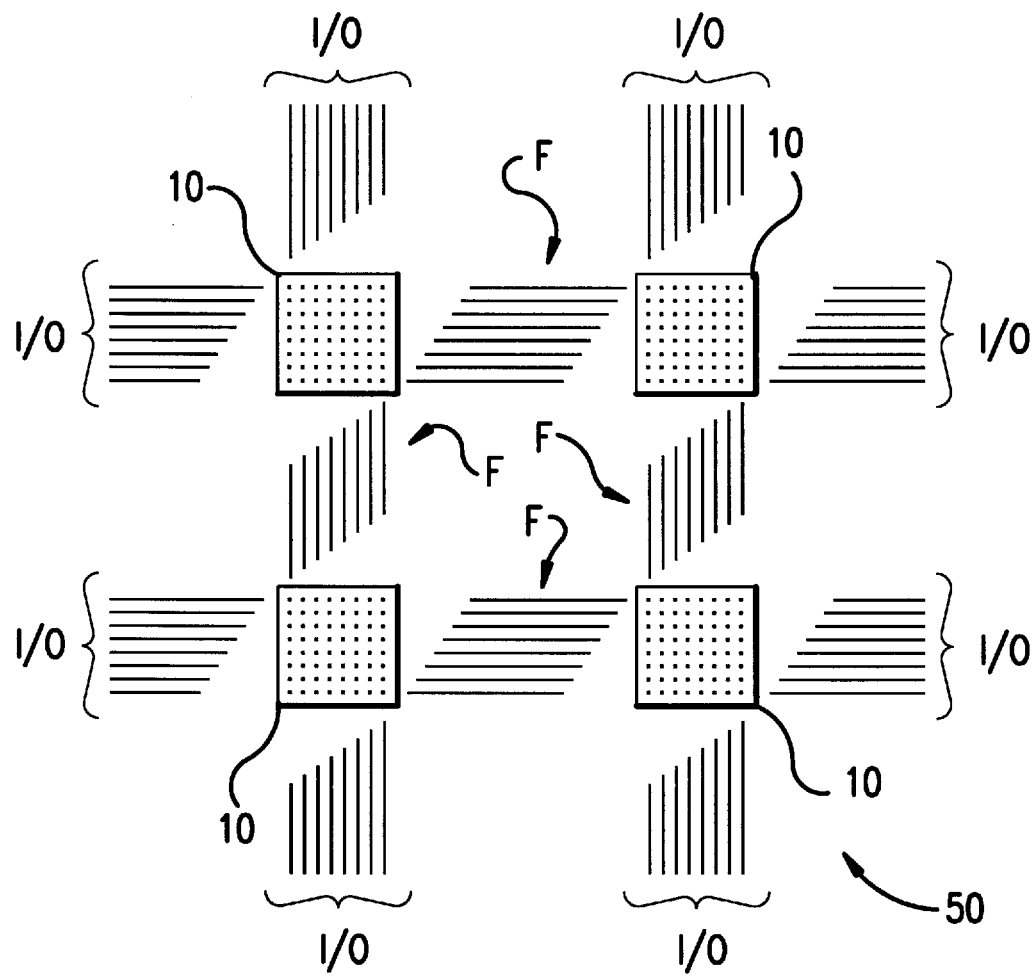
FIG. 4 shows a cascaded switch constructed according to an alternate preferred embodiment of the present invention.

FIG. 4 shows a cascaded switch 50 constructed according to an alternate embodiment of the present invention. Additional interconnecting fibers F are added to each cross-connect switch 10 in a staggered arrangement. The interconnecting fibers F enable incident beams aligned with input/output fibers I/O to couple to the interconnecting fibers F when no pins 18 in a corresponding row or column of the pin grid actuators 12 are actuated, that is, when no reflective surfaces 20 intercept the incident beams 25. The staggered arrangement of lenses 26 in the interconnecting fibers F provides equal pathlength through the switch for incident beams 25 that couple through a pin grid actuator when no pins in its corresponding row or column are actuated. A 16 by 16 cascaded switch 50 formed by cascading four 8 by 8 optical cross-connect switches 10 is shown. Cascaded switches 50 having larger numbers of input and output fibers I/O may also be formed by combining a greater number of cross-connect switches 10.

What is claimed is:

1. An optical cross-connect switch, comprising:
   a pin grid actuator, including,
   a housing having a planar top surface and an array of holes through the housing orthogonal to the planar top surface,
   an array of pins, each pin penetrating one of the holes and having a first end proximate to the planar top surface and a second end distal to the planar top surface,
   an array of actuators, each actuator coupled to a corresponding pin at the second end and each actuator having a control line and linearly moving the corresponding pin in a direction perpendicular to the planar top surface to one of a retracted position and an extended position, according to a signal applied to the control line;
   a plurality of input fibers, each input fiber having an input lens at its end and providing an incident optical beam propagating parallel to the planar top surface;
   an array of optical elements, each optical element attached to the first end of each of the pins, forming a redirected optical beam from the incident optical beam when the pin is in the extended position and the optical element intercepts the incident optical beam;
   a plurality of output fibers, each output fiber having an output lens at its end and receiving the redirected beams; and
   at least one substrate attached to the planar top surface, securing the positions of the input fibers and output fibers.

2. The optical cross-connect switch of claim 1 wherein each optical element in the array of optical elements includes a reflective surface orthogonal to an alignment axis.

3. The optical cross-connect switch of claim 2 wherein the redirected optical beam comprises a reflected optical beam formed when the reflective surface intercepts the incident optical beam.

4. The optical cross-connect switch of claim 3 wherein the reflected optical beam is parallel to the planar top surface.

5. The optical cross-connect switch of claim 4 wherein the reflected optical beam is orthogonal to the incident optical beam and the alignment axis is at a 45 degree angle to each of the incident optical beam and the reflected optical beam.

6. The optical cross-connect switch of claim 5 wherein the array of optical elements forms a square matrix having an equal number of rows of optical elements and columns of optical elements and the incident optical beam from each input fiber aligns with a row of the optical elements and the reflected optical beam received by each output fiber aligns with a column of optical elements.

7. The optical cross-connect switch of claim 6 wherein the distance between the input lenses and output lenses that the incident optical beam and reflected optical beam propagate equals a predetermined pathlength.

8. The optical cross-connect switch of claim 7 wherein the predetermined pathlength is independent of which optical element in the array of optical elements intercepts the optical beam.

9. The optical cross-connect switch of claim 8 wherein the input lenses are located on a first axis and the output lenses are located on a second axis, the first axis and the second axis and the alignment axis are parallel and coplanar and the first axis and the second axis are equidistant from the alignment axis.

10. The optical cross-connect switch of claim 9 wherein the optical elements are fabricated by:
   covering a first surface of a rigid substrate with optically reflective material;
   dividing the substrate into narrow strips;
   stacking the narrow strips whereby the optically reflective material of each strip faces the alignment axis;
   separating each narrow strip in the stack using spacers having a predetermined thickness to form a stack of alternating narrow strips and spacers;
   cutting the narrow strips into separate pieces to form the array of optical elements;

attaching the array of optical elements to the first end of pins in the array of pins whereby each pin in the array attaches to a separate optical element in the array; and removing the spacers from the stack of alternating narrow strips and spacers.

11. The optical cross-connect switch of claim 10 wherein the rigid substrate comprises a glass slide.

12. The optical cross-connect switch of claim 11 wherein the at least one substrate is fabricated from silicon having multiple grooves receiving the plurality of input fibers and the plurality of output fibers and having multiple slots receiving the input lenses and output lenses.

13. The optical cross-connect switch of claim 9 further comprising a plurality of interconnecting fibers aligned with the plurality of input fibers, receiving the incident optical beams when the pins corresponding to the row of optical elements aligned with the incident optical beam are in the retracted position.

14. An optical cross-connect switch for receiving optical beams from a series of input fibers and for routing the optical beams to a series of output fibers according to an applied control signal, the optical cross-connect switch comprising:

a pin grid actuator, including, a housing having a planar top surface and a matrix of holes arranged in rows and columns, a plurality of pins, each pin penetrating a corresponding hole in the matrix and having a first end proximate to the planar top surface and a second end distal to the planar top surface, a plurality of actuators, each actuator coupled to the second end of a corresponding pin at the second end and each actuator having a control line and linearly moving the corresponding pin in a direction perpendicular to the planar top surface to one of a retracted position and an extended position, according to the applied control signal to the control line;

at least one substrate attached to the planar top surface, securing the series of input fibers to a first edge of the housing in a parallel arrangement and in alignment with the rows of the matrix and securing the series of output fibers to a second edge of the housing adjacent to the first edge in a parallel arrangement and in alignment with the columns of the matrix;

a plurality of aligned optical elements each having a reflective surface attached to the first end of each pin whereby the reflective surface redirects the received optical beams from the input fibers to the output fibers when the pins are in the extended position.

15. The cross-connect switch of claim 14 wherein the matrix of holes forms a square matrix having an equal number of rows and columns.

* * * * *